F. GOFF.
AIR BRAKE SYTEM.
APPLICATION FILED JULY 1, 1910.
991,500.
Patented May 9, 1911.
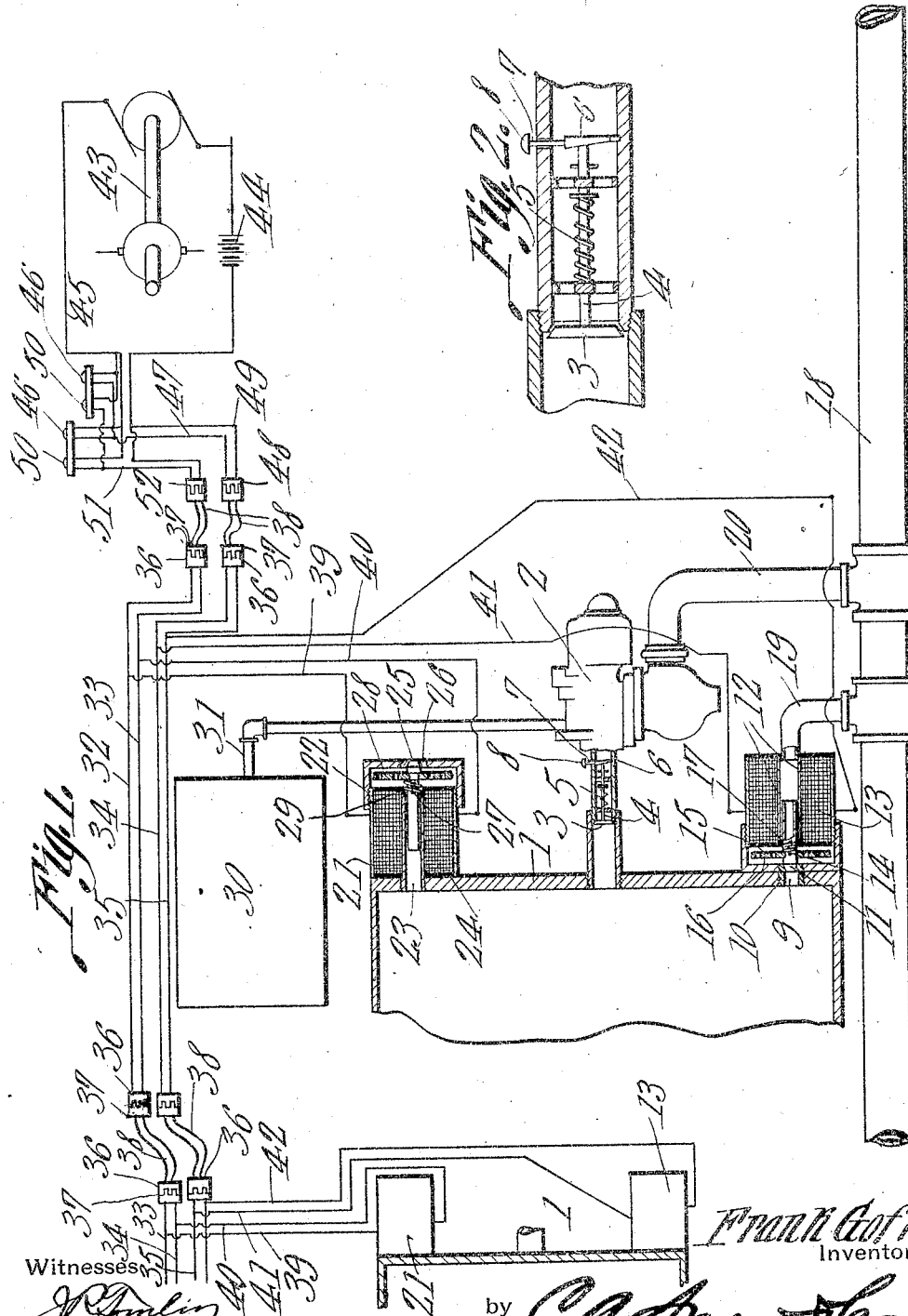
Frank Goff,
Inventor
by C. A. Snow & Co.
Attorneys
Witnesses

UNITED STATES PATENT OFFICE.

FRANK GOFF, OF CAMDEN, NEW JERSEY.

AIR-BRAKE SYSTEM.

991,500. Specification of Letters Patent. Patented May 9, 1911.

Application filed July 1, 1910. Serial No. 570,008.

*To all whom it may concern:*

Be it known that I, FRANK GOFF, a citizen of the United States, residing at Camden, in the county of Camden and State of New Jersey, have invented a new and useful Air-Brake System, of which the following is a specification.

This invention relates to air brake systems and more particularly to means whereby the application and the release of the brakes may be electrically controlled, said apparatus being used either in connection with or independently of the ordinary triple valve.

Another object of the invention is to provide electrically operated means under full control of the engineer and whereby air may be caused to flow in any desired quantities from the train pipe directly to each brake cylinder so that the brakes of all the cars will be simultaneously applied regardless of the length of the train.

Another object is to provide a release valve upon the brake cylinder of each car in the train, all of the valves being adapted to be electrically operated at the same time.

A further object is to provide means whereby the auxiliary reservoirs may be recharged while the brakes are set, thus maintaining additional air pressure under each car for prompt delivery to the brake cylinders when it is desired to apply the brakes.

With these and other objects in view the invention consists of certain novel details of construction and combinations of parts hereinafter more fully described and pointed out in the claims.

In the accompanying drawings the preferred form of the invention has been shown.

In said drawings:—Figure 1 is a view showing, in diagram, the system constituting the present invention. Fig. 2 is an enlarged section of the auxiliary valve interposed between the brake cylinder and the triple valve.

Referring to the figures by characters of reference 1 designates a brake cylinder which may or may not be connected to the usual triple valve such as indicated at 2 and which is employed in the well known Westinghouse system. Where this triple valve is utilized, the pipe connection between the valve and the brake cylinder is provided with a supplemental valve such as has been shown in detail in Fig. 2. The valve, which has been indicated at 3, has a stem 4 upon which is arranged a spring 5 adapted to hold the valve normally upon its seat. A wedge 6 is movable transversely of the valve casing and adjacent the free end of the valve stem, this wedge having a stem 7 which projects beyond the valve casing and is provided with a head 8. By shifting the wedge in one direction, the stem 4 can be moved longitudinally so as to place the spring 5 under stress and unseat the valve 3. When, however, the wedge shifts in the opposite direction, the spring 5 will reseat the valve 3. An inlet port 9 is formed within the cylinder 1 and has a tubular screw plug 10 detachably mounted therein and which constitutes the seat for the application valve 11. Said valve is formed at one end of the tubular core 12 of a solenoid 13 there being openings 14 in said core and close to the valve 11 through which air is free to pass from the interior of the core to the interior of the casing 15 in which the solenoid is mounted. A perforated disk 15 is secured to the core 12 adjacent the valve 11, the openings 14 being located back of this disk or, in other words, between the disk and the magnet. A coiled spring 17 may be mounted upon the core and between the disk and magnet for the purpose of holding the valve 11 normally yieldingly upon its seat.

The brake pipe 18 is connected to the casing 15 directly back of the tubular core 12, by means of a branch pipe 19, and, if the triple valve 2 is employed, another branch pipe 20 is extended from the pipe 18 to said valve as ordinarily.

A solenoid 21 is mounted on the brake cylinder 1 and is arranged within a casing 22, the passage through the center of the solenoid registering with a port 23 formed within the cylinder 1. The said solenoid has a tubular core 24 provided, at one end, with a valve 25 normally bearing against a threaded seat 26 removably mounted in one end of the casing 22. The core 24 has ports or openings 27 therein whereby communication is established between the interior of the core 24 and the interior of the casing 22. A perforated disk 28 is secured to the core 22 at a point between the valve 25 and the solenoid 21 and a spring 29 is coiled about this core and is arranged to hold the valve normally on its seat.

An auxiliary reservoir 30 is arranged on each car and is connected by a pipe 31 with the triple valve in the ordinary manner.

Each car of a train is adapted to be equipped with the mechanism which has been described. A series of conductors indicated by the numerals 32, 33, 34 and 35 is arranged along each car, said conductors being provided at the ends of the car, with plugs or sockets 36 adapted to be engaged by members 37 secured to the end of connecting conductors 38 whereby the corresponding conductors of adjacent cars can be electrically connected. The conductor 32 of each car is electrically connected, by a conductor 39, with one of the solenoids 21 and the conductor 33 of each car is electrically connected, by a conductor 40, with the same solenoid. Each solenoid 13 is connected, by a conductor 41, with the conductor 34 on its car, and said solenoid is also connected by a conductor 42, with the conductor 35 on said car. It will thus be seen that when all of the cars are coupled together, the solenoids 21 will be arranged in multiple as will also the solenoids 13.

The locomotive is provided with a generator 43 and a storage battery 44, there being a conductor 45 extending from the source of electricity and electrically connected to a switch 46 in the form of a push button or the like, the other conductor extending from the switch, and which has been shown at 47, being extended to a plug switch 48 or the like, to which extends a conductor 49 extending from one of the poles of the source. Another switch 50 is electrically connected to the conductor 45 and has a conductor 51 extending to another plug switch 52, there being a conductor extending from this plug switch 52 to the conductor 49. If desired two sets of switches 46 and 50 may be provided in the locomotive, these sets being located at points where they can be most conveniently reached by the engineer.

It will be apparent that when the circuit to the various solenoids 13 of the train is closed by depressing the button 46 in the locomotive all of the said solenoids will be energized and the valves 11 unseated, thus permitting air to pass from the pipe 18 through the branches 19 and the tubular cores 12 to the interiors of the cylinders 1 by way of ports 9, it being understood that the air passes from the cores and into the ports by way of the openings 14 in said cores. The admission of the air to the cylinders is simultaneous throughout the length of the train and can be readily controlled so as to obtain either a quick or a slow application simply by varying the length of time in which the circuit is closed.

The release of all the brakes is effected simultaneously by completing the circuit through the solenoids 21. This is done by closing the circuit at 50. When the magnets are energized the valves 25 are simultaneously unseated and the air therefore permitted to escape through the ports 23 and the hollow cores 24. This release of the air is under the absolute control of the engineer and it will be apparent that the release of the brakes can be effected as rapidly as may be desired simply by varying the length of time during which the circuit is closed.

As has heretofore been stated, the electrically operated application and release valves can be used with or without the ordinary triple valve. When the triple valve is not in use, the valve 4 is kept upon its seat by the spring 5, thus, should it be desired to use this triple valve in connection with either of the valves 11 and 25, valve 3 is shifted to its open position by the wedge 6 which serves to hold said valve open.

Attention is directed to the fact that by utilizing valves such as have been described, the auxiliary reservoir can be charged while the brakes are applied.

It will be apparent that by utilizing the valve which has been described, all brakes will be caused to assume their released positions simultaneously regardless of the number of cars or the length of the train. Moreover this release can be entirely or partly effected, according to the will of the engineer and permits trains of any length and traveling at any speed, to be brought to a stop with absolute safety and smoothness.

By employing the release valve, it becomes unnecessary to employ excess pressure in the main reservoir and there is therefore no danger of leaking joints in the air pipes, burst air hose, and the attendant strain and damage to other parts of the air brake mechanism resulting from an overcharged train line. A large number of parts of the ordinary air brake system may be eliminated, among these being the graduating valves, the triple exhaust ports, etc., of the triple valves, and many of the air passages in the engineer's brake valve, this being due to the fact that but three positions of the brake valve handle are necessary, namely, running position, service application position, and emergency position. It is a well known fact that where the ordinary air-brake system is employed the front portion of a long train is often started before the rear portion of the same has been released, with the result that the train is often pulled apart. Moreover when the brakes are applied to a long train, the front portion of the train is often brought to a stop before the brakes are applied to the rear cars and, as a result, the back portion of the train often piles upon the front portion thereof and thus causes considerable damage. By utilizing valves which will all simultaneously operate, these objectionable features are eliminated.

It is of course to be understood that various changes may be made in the construction and arrangement of the parts without departing from the spirit or sacrificing any of the advantages of the invention as defined in the appended claims.

What is claimed is:—

1. Apparatus of the class described including a brake cylinder, a triple valve, a valved connection between said valve and the cylinder, means for holding said valve off of its seat, an application valve, a release valve, and separate electrically operated means for unseating the application and release valves.

2. In apparatus of the class described, a brake cylinder, a valve for closing communication therewith, a tubular stem upon the valve, said stem having outlet openings adjacent the valve, a perforated disk upon the stem and adjacent the openings, and a solenoid, said stem constituting the core of the solenoid.

In testimony that I claim the foregoing as my own, I have hereto affixed my signature in the presence of two witnesses.

FRANK GOFF.

Witnesses:
 ELMER E. COX,
 ERNEST H. COX.